US012791694B2

(12) United States Patent
Helfrecht et al.

(10) Patent No.: US 12,791,694 B2
(45) Date of Patent: Nov. 10, 2026

(54) GAZE-TRACKED RADAR CONTROL SYSTEM

(71) Applicant: Rockwell Collins, Inc., Cedar Rapids, IA (US)

(72) Inventors: Brian O. Helfrecht, Wilsonville, OR (US); Brandon E. Wilson, Portland, OR (US); Carlo L. Tiana, Goldendale, WA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 298 days.

(21) Appl. No.: 18/530,172

(22) Filed: Dec. 5, 2023

(65) Prior Publication Data

US 2025/0180724 A1 Jun. 5, 2025

(51) Int. Cl.
*G01S 13/06* (2006.01)
*G06F 3/01* (2006.01)

(52) U.S. Cl.
CPC .............. *G01S 13/06* (2013.01); *G06F 3/013* (2013.01)

(58) Field of Classification Search
CPC ................................ G01S 13/06; G06F 3/013
See application file for complete search history.

(56) References Cited

U.S. PATENT DOCUMENTS 7,925,391 B2 * 4/2011 Sanders-Reed ........... G06F 3/14 348/14.02
8,629,903 B2 1/2014 Seder et al.
9,533,772 B2 1/2017 Davalos et al.
9,690,104 B2 6/2017 Kim
10,007,333 B2 * 6/2018 Fateh .................... G09G 3/003
10,848,710 B2 11/2020 Leech et al.
(Continued)

FOREIGN PATENT DOCUMENTS

CN 112141344 A 12/2020
EP 2648604 A1 10/2013
(Continued)

OTHER PUBLICATIONS

Department of Defense Interface Standard, "Lighting, Aircraft, Night Vision Imaging System (NVIS) Compatible" MIL-STD-3009, Feb. 2, 2001.
(Continued)

*Primary Examiner* — Bernarr E Gregory
*Assistant Examiner* — Isabella A Edrada
(74) *Attorney, Agent, or Firm* — Suiter Swantz IP

(57) ABSTRACT

A system and method for determining a position of viewed object is disclosed. The system includes a head/eye tracker configured to sense at least one gaze target in an environment corresponding to a gaze of an eye or head of a first operator and at least one remote object sensor configured to sense an object corresponding to the gaze target. The system further includes at least one controller in communication with the head/eye tracker and the remote object sensor configured to receive gaze target data, transmit commands to the remote object sensor to steer transmission beams toward the viewed object based on the gaze target data, wherein a reflection of the steered transmission beams from the object is received by a receiver, receive reflection data from the receiver, generate object position data based on the reflection data, and transmit the object position data.

12 Claims, 9 Drawing Sheets

(56) References Cited

U.S. PATENT DOCUMENTS

| | | | | |
|---|---|---|---|---|
| 11,035,945 | B2 * | 6/2021 | Philipp | G01S 13/4463 |
| 11,958,360 | B2 * | 4/2024 | Inada | B60K 35/10 |
| 2019/0346678 | A1 * | 11/2019 | Nocham | G06F 3/0484 |
| 2020/0271841 | A1 | 8/2020 | English et al. | |
| 2021/0049925 | A1 * | 2/2021 | Robinson | G09B 9/08 |
| 2022/0350138 | A1 | 11/2022 | Wiggeshoff | |
| 2023/0039414 | A1 | 2/2023 | Tiana et al. | |
| 2023/0039764 | A1 | 2/2023 | Wu et al. | |
| 2023/0043771 | A1 | 2/2023 | Wu et al. | |

FOREIGN PATENT DOCUMENTS

| | | | |
|---|---|---|---|
| EP | 3092546 | A1 | 11/2016 |
| GB | 2222937 | A | 3/1990 |

OTHER PUBLICATIONS

European Search Report received in EP Application No. 24217585.9, Apr. 22, 2025, 11 pages.

* cited by examiner

GAZE-TRACKED RADAR CONTROL SYSTEM

BACKGROUND

Scanning radars in avionic systems are often directed to scan a fixed region in space relative to the platform the radar is installed on, with all observations in the scan made for an equal amount of time. This can cause energy to be directed to regions that a user is not interested in, resulting in a loss of time-on-target for true regions of interest. Therefore, there is a need for radar systems that reduce energy consumption and loss of time-on-target for true regions of interest.

SUMMARY

A system is disclosed. In one or more embodiments, the system includes at least one head tracker or eye tracker configured to sense at least one gaze target in an environment corresponding to a gaze of an eye or head of a first operator; at least one remote object sensor configured to sense an object corresponding to the gaze target comprising: at least one transmitter; and at least one receiver, wherein the remote object sensor is configured to transmit steered transmission beams; and at least one controller in communication with the head tracker or the eye tracker and the remote object sensor, the controller configured to: receive gaze target data from the head tracker or the eye tracker; transmit commands to the remote object sensor to steer transmission beams toward the object based on the gaze target data, wherein a reflection of the steered transmission beams from the object is received by the receiver; receive reflection data from the receiver; generate object position data based on the reflection data; and transmit the object position data.

In some embodiments, the system further includes a first display, wherein the first display is configured to receive image data based on the object position data and display an image of the object based on the image data.

In some embodiments of the system, a gaze path passes through or projects upon a portion of the first display, wherein the image of the object is displayed upon a same portion of the first display.

In some embodiments, the system further includes a second display, wherein the second display displays a virtual gaze target corresponding to the at least one gaze target, wherein a gaze path passes through or projects upon a portion of the second display, wherein the image of the object is displayed upon the first display or the second display.

In some embodiments, the system further includes a second display, wherein the second display displays a virtual gaze target corresponding to the gaze target, wherein a gaze path passes through or projects upon a portion of the second display, wherein the image of the object is displayed on a third display viewable by a second operator.

In some embodiments of the system, the first display is a head up display (HUD), a helmet mounted display (HMD), or a head-wearable device (HWD).

In some embodiments of the system, the environment is a real-world environment.

In some embodiments of the system, the environment is a synthetic environment, wherein the at least one gaze target is positioned on a display viewed by the operator.

In some embodiments of the system, the environment is a virtual environment.

In some embodiments of the system, the at least one remote object sensor is coupled to an immobile structure.

In some embodiments of the system, the at least one remote object sensor is coupled to a vehicle.

In some embodiments of the system, the remote object sensor comprises a radar sensor.

In some embodiments of the system, the remote object sensor comprises a lidar sensor.

A method for determining a position of an object is disclosed. In one or more embodiments, the method includes receiving gaze target data from a head tracker or an eye tracker; transmitting commands to a remote object sensor to transmit steered transmission beams toward the object based on the gaze target data, wherein a reflection of the steered transmission beams is received by a receiver; receiving reflection data from the receiver; generating object position data based on the reflection of the steered transmission beams; and transmitting the object position data.

In some embodiments, the method further includes displaying the position of the object on a display based on the object position data.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Figure 1A:
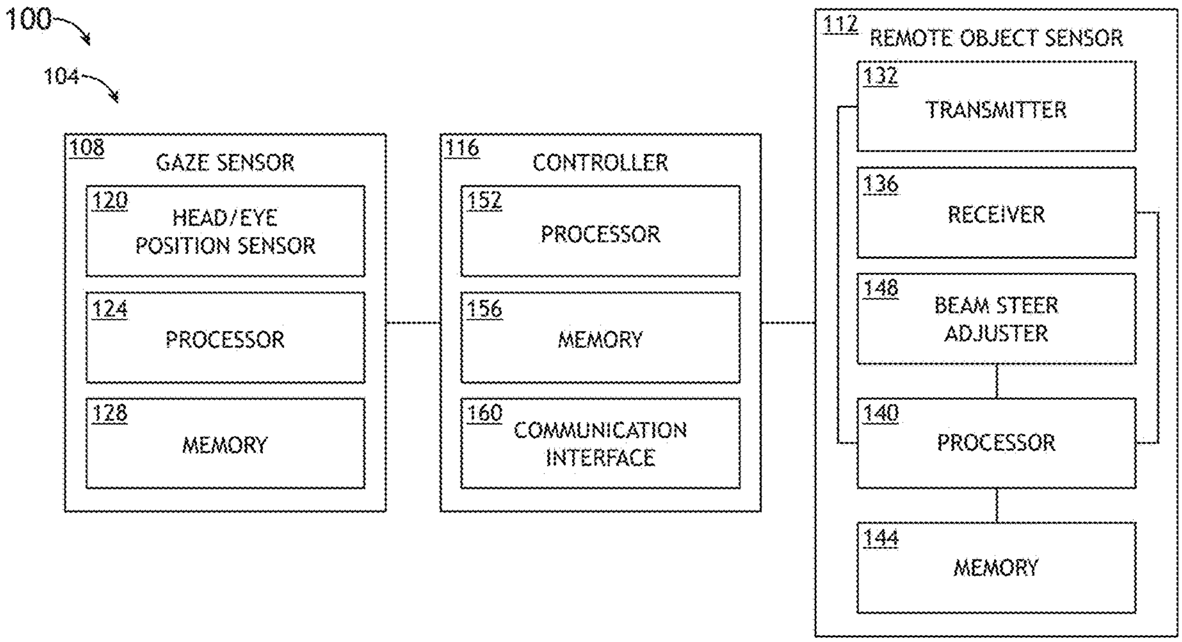
FIG. 1A illustrates a block diagram of a system for sensing a gaze target, in accordance with one or more embodiments of the disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein are for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present), and B is false (or not present), A is false (or not present), and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method and a system, which may include at least one gaze sensor (e.g., a head or eye tracking device (head tracker or eye tracker) that can sense the gaze of an operator) configured to sense and/or determine at least one gaze target in an environment corresponding to an eye or head of a first operator. In some embodiments, the system includes at least one remote object sensor (e.g., a radar sensor/system or lidar sensor/system) that is configured to detect an object (e.g., a vehicle, such as aircraft or automobile) and determine a distance or position of the object relative to the remote object sensor. The system may include one or more controllers (e.g., containing one or more processors) that are in communication with the one or more gaze sensors and the remote object sensors.

In embodiments, the one or more controllers are configured to receive gaze target data and transmit commands to direct the remote object sensor to steer transmission of a beam (e.g., radio/microwave beams or laser beams) toward an object that corresponds to the gaze target, wherein beams reflected from the object are received by a receiver of the remote object sensor. In embodiments, the controller receives reflection data from the receiver and generates object position data which can then be transmitted (e.g., to a display) for viewing by the first operator. In this manner, a first operator can gaze upon a target (e.g., either through a window in a real-world environment, or on displays in a synthetic vision environment or virtual environment), and a radar, lidar, or other remote object sensor will be directed towards that region of interest (e.g., the gaze target) and will report to the first operator on a display the data (e.g., images) that are received by the remote object sensor. The system focuses the operation of the remote object sensor on specific regions of interest, and reduces the time or energy focusing on areas of less interest for the operator, resulting in increased time and energy efficiency over other systems.

In some embodiments, some or all of the gaze sensor and/or displays of the system may be included within and/or on a head-wearable device (HWD) (e.g., a head-wearable display device, such as a helmet-mounted display (HMD)) or a head up display (HUD) and/or may be implemented in proximity to eye(s) of a user (e.g., a pilot, driver, or air traffic controller).

Figure 1B:
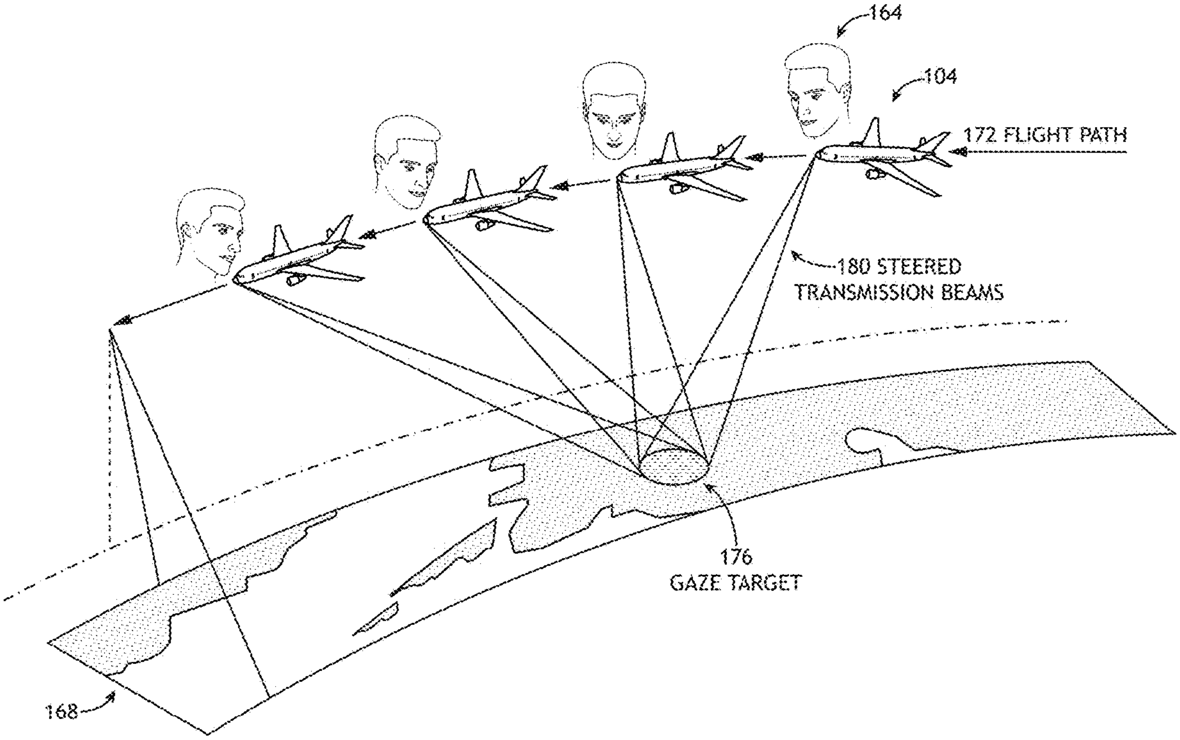
FIG. 1B illustrates steering of aircraft transmission beams based on the gaze target of an operator, in accordance with one or more embodiments of the disclosure.

Referring now to FIGS. 1A, 1B, 2A, 2B, 2C, 3A, 3B, 4, and 5, exemplary embodiments of a system 100 according to the inventive concepts disclosed herein are depicted. The system 100 may be implemented with or coupled to any suitable system, such as at least one vehicle (e.g., an aircraft, a spacecraft, an automobile, a watercraft, a submarine, or a train), an immobile structure (e.g., an air traffic control building, a tactical command center), or a hybrid system that includes a vehicle (e.g., an aircraft) and an immobile structure (e.g., a traffic control building). For example, as shown in FIG. 1B, the system 100 may include an aircraft 104. For example, aircraft 104 may include at least one gaze sensor 108 (e.g., a head or eye tracking device (head tracker or eye tracker) that can sense the gaze of an operator), one remote object sensor 112 (e.g., a radar system or lidar system), and a controller 116 in communication with (e.g., communicatively coupled at any given time to) the gaze sensor 108 and the remote object sensor 112. Communication between the gaze sensor 108, the controller 116, and the remote object sensor 112 may be implemented via wireless or wireline technology. The controller 116 provides processing functionality for one or more components of the system 100.

In some embodiments, the gaze sensor 108 may include a head/eye position sensor 120 operatively coupled to one or more processors 124 and memory 128. The head and/or eye tracking system 106 may have optical, magnetic, and/or inertial tracking capability. The gaze sensor 108 is configured to determine at least one gaze target in an environment corresponding to an eye and/or head of a first operator (e.g., pilot, driver, or air traffic controller) based on data received from the head/eye position sensor 120. The system 100 may also receive other data (e.g., from external cameras, remote object sensors and other system components, etc.) that may also be used along with data from the gaze sensor to determine the gaze target. The head/eye position sensor 120 is configured to sense and/or determine the relative position of the head and/or eye. In some embodiments, the head/eye position sensor 120 is capable of determining the at least one gaze target. Therefore, in some embodiments, the head/eye position sensor is a gaze sensor 108.

As referred to herein, a "gaze target" is an object or area within a field of view (FOV) that an operator (e.g., first operator) is intending to view within an environment. For example, and in some embodiments, the system 100 is operating in a real-world environment, where the gaze target may be a physical object, such as an aircraft, that an air traffic controller is attempting to view through a window. In another example, the gaze target may be an area viewed by a pilot in a cockpit where the pilot is looking for, or expects to see, a second aircraft. For instance, the second aircraft may be obscured by weather phenomenon (e.g., fog, snow, rain) with the pilot's gaze target being the general area where the pilot suspects is the position of the second aircraft. The gaze sensor 108 tracks the eye or head in order to identify the gaze target and/or gaze path of the operator. The gaze sensor 108 may also track the eye and/or head in order to identify a virtual gaze target and/or gaze path, such as a gaze target on a physical 2D display, or a gaze target in a virtual reality environment.

In some embodiments, the remote object sensor 112 may include a transmitter 132 (e.g., a radar transmitter or a lidar transmitter), a receiver 136 (e.g., a receiver for receiving radio/microwave transmissions or laser transmissions, such as reflections from transmissions transmitted by the transmitter 132), processors 140, memory 144, and a beam steer adjuster 148, with one or more components of the remote object sensor 112 communicatively or operatively coupled. The beam steer adjuster 148 may be mechanical (e.g., for mechanically steered radar/lidar systems) and/or electronic (e.g., for electronically steered radar/lidar systems). Examples of electronically steered radar systems include, but are not limited to, electronically scanned arrays (ESA) active electronically scanned arrays (AESA), and passive electronically scanned arrays (PESA). More than one type of remote object sensor may be used (e.g., mechanically steered sensors, electronically steered sensors, or both).

In embodiments, the one or more controllers 116 communicates with both the gaze sensor 108 and remote object sensor 112 to coordinate the movement of (e.g., steer) the transmission beam of the transmitter 132 with the gaze target of the operator. For example, in the real-world environment, when the pilot views an object through a cockpit window, the gaze sensor 108 identifies the gaze target corresponding to the object via data from the head/eye position sensor 120. The controller 116 then receives gaze target data from the gaze sensor 108 (e.g., the gaze target), and then transmits commands to the remote object sensor 112 to adjust the transmission beam (e.g., mechanically, and/or electronically) toward the gaze target. Once adjusted, the reflections of the steered transmission beam are received as reflection data and the one or more controllers can generate object position data based upon the reflection data. This object position data is then sent to the first operator or other pilot, driver, or traffic controller.

Referring to FIG. 1B, a first operator 164 (e.g., pilot) is shown flying over a region 168 along a flight path 172. At several points along the flight path 172, the first operator 164 focuses on a gaze target 176. While looking at the gaze target, the system 100, via the gaze sensor, is able to determine the gaze target 176 of the first operator 164 and is able to adjust the remote object sensor 112 via the beam steer adjuster 148 so that the transmitter 132 transmits steered transmission beams 180, which are reflected and received by the receiver 136. The controller 116 then receives the reflection data from the receiver and generates object position data corresponding to the gaze target 176 to the first operator 164. The system may include additional logic so that if the first operator 164 is looking at something else (e.g., a passenger or instrument panel), the system 100 will control the steering of the transmission beams 180 so that the remote object sensor 112 does not attempt to steer the transmission beams 180 toward an unwanted scan area. For example, the system 100 may direct the remote object sensor 112 to direct the transmission beams in a fixed pattern, a pre-determined scan pattern, and/or an artificial intelligence-based scan pattern. In some embodiments, scanning patterns may be combined with search/track algorithms. For example, the system 100 may include "smart" scanning where there is an assumption of the system 100 to assume a standard scan pattern when the pilot is looking for an instrument (e.g., +/−10 degrees of boresight), then jump to a focused or activated pattern when looking outside of that region.

As shown herein, if the first operator 164 is viewing a head down display or a virtual reality display, the system 100 calculates the world geographic coordinates of the real-world gaze target 176, based on the gaze of the first operator 164 to the "synthetic" or virtual gazed target 176 on the display screen and adjusts the transmission beams 180 to the corresponding real-world gaze target 176 (e.g., the remote object sensors 112 direct themselves toward the real-world gaze target 176 corresponding to the displayed (e.g., synthetic or virtual) gaze target 176.

Figure 2A:
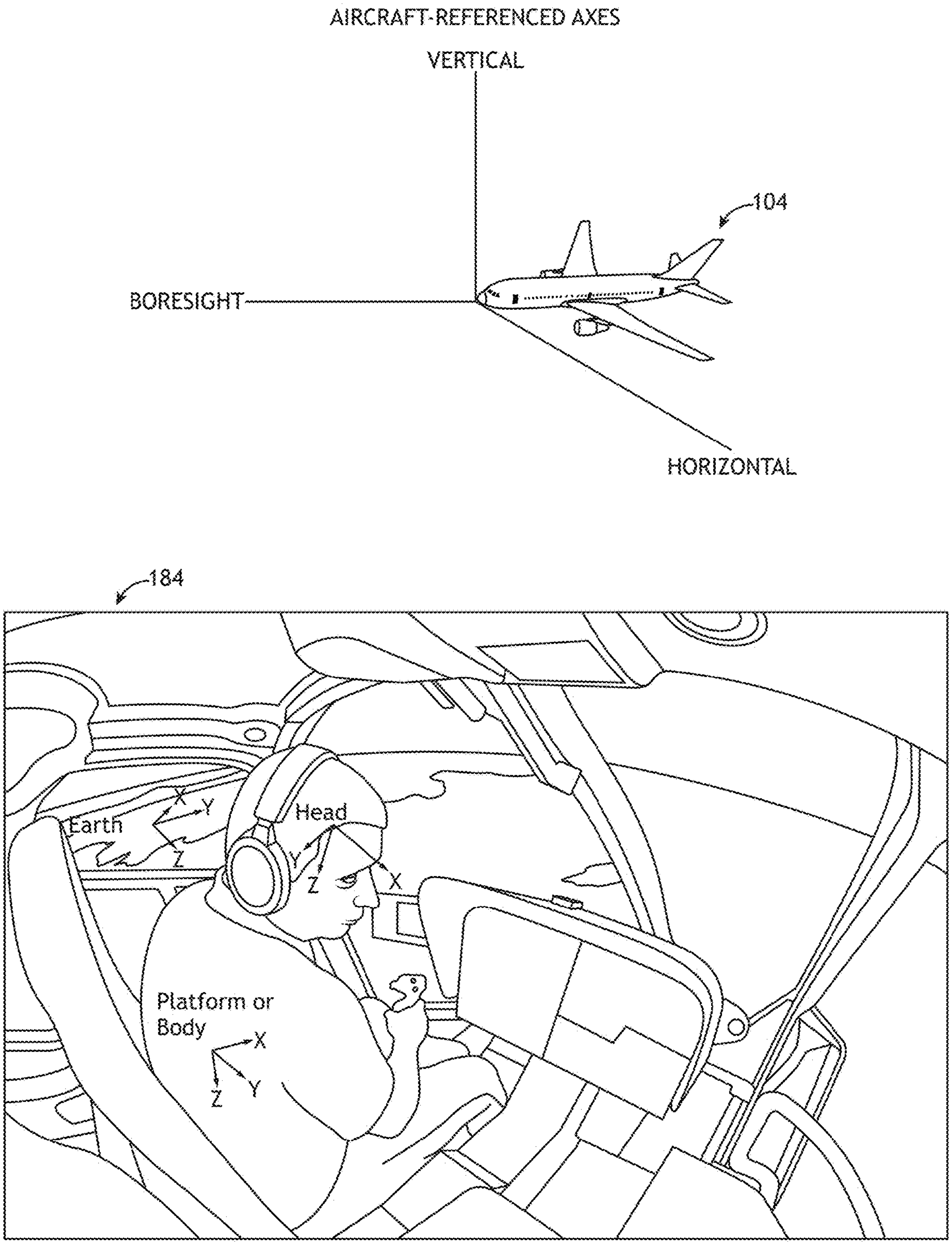
FIG. 2A illustrates the references axes of an aircraft and the references axes of the Earth, head/eye of an operator, and cockpit, in accordance with one or more embodiments of the disclosure.
Figure 2B:
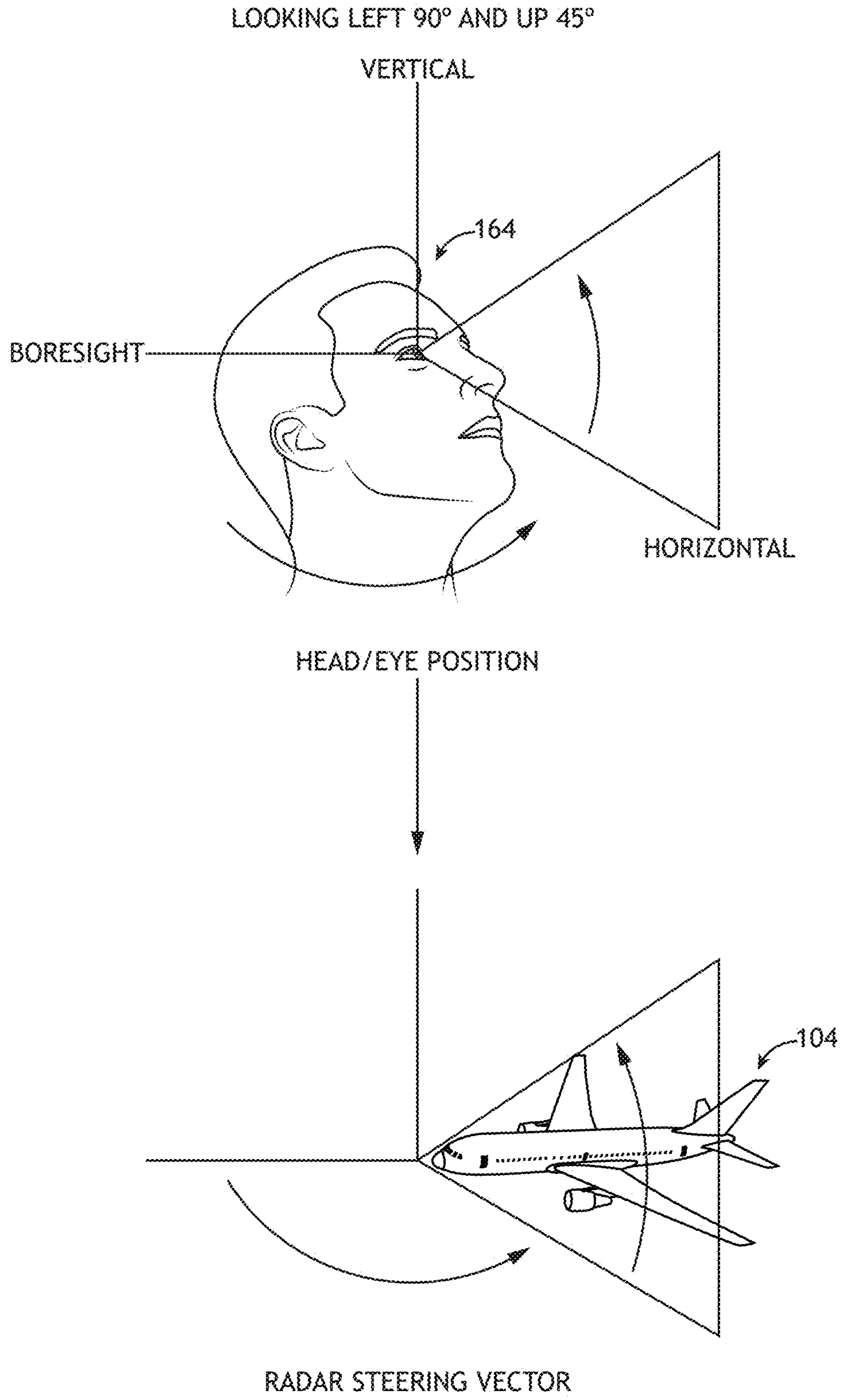
FIG. 2B and FIG. 2C illustrate the relative axes of an operator and an aircraft, in accordance with one or more embodiments of the disclosure.
Figure 2C:
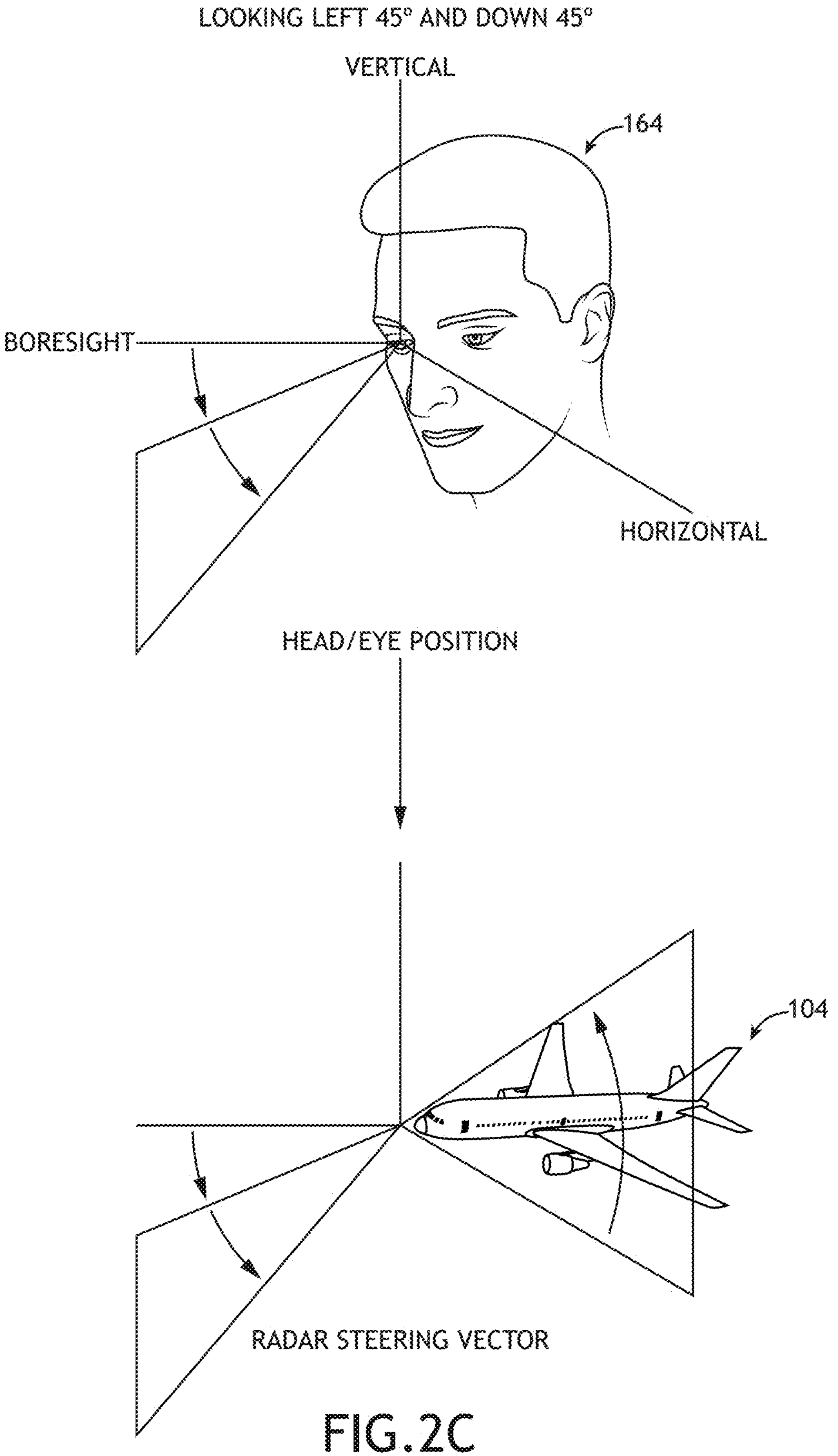

Referring to FIGS. 2A-2C, the system 100 is configured to synchronize the gaze of the first operator 164 with the steering of the remote object sensors 112. This synchronization requires the knowledge of the axes of the aircraft 104/platform to the earth, of the first operator 164 to the aircraft 104/platform, and in some cases the first operator 164 to the earth. For example, in FIG. 2A, the boresight, vertical, and horizontal axes of the aircraft 104 relative to the earth are considered, which may include the addition of azimuth angle data and/or elevation angle data, as the earth is a sphere. In addition, the axes in reference to the first operator's head or eyes (e.g., elevation angle) from within a cockpit 184 relative to the aircraft 104 or platform are identified. The axes in reference to the relative position of the remote object sensor 112 may also be identified.

Once the relative positions of the operator 164 (e.g., operator's gaze), the aircraft, and the remote object sensor are known, the position of the operator's gaze can be synchronized with the remote object sensor 112 of the aircraft 104 or platform. For example, as shown in FIG. 2B, if an operator 164 that was originally looking straight ahead looks left 90 degrees and upward 45 degrees, the system 100 will detect the change in gaze target 176 and cause the remote object sensor 112 to steer the transmission beams 180 accordingly so that the transmission beams 180 are interrogating the same area or view that the first operator 164 is viewing. Similarly, and as shown in FIG. 2C, if the first operator looks left 45 degrees and downward 45 degrees, then the system 100 will cause a corresponding change in the steering of the transmission beams 180.

Figure 3A:
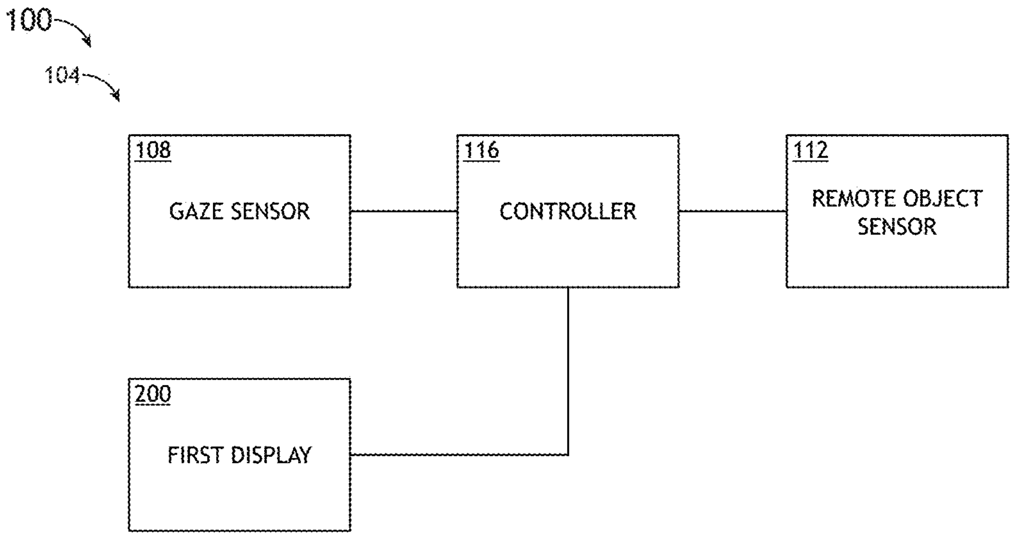
FIG. 3A illustrates a block diagram of a system for sensing a gaze target, further including a first display, in accordance with one or more embodiments of the disclosure.
Figure 3B:
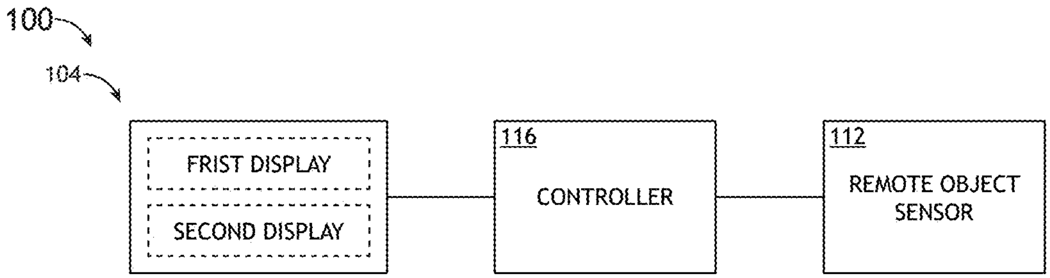
FIG. 3B illustrates a block diagram of a system for sensing a gaze target, further including a second display, in accordance with one or more embodiments of the disclosure.

In some embodiments, the system 100 includes or is operatively coupled to a first display 200. The first display 200 is configured to receive object position data (e.g., image data based on the received object position data) and display the object and/or the relative position of the object on the first display 200. The first display 200 may be any type of display including but not limited to a monitor (head down display, HWD, HUD, or virtual reality (VR) display. For example, and as shown in FIG. 3A, the gaze sensor 108 (e.g., located either externally to the first display 200 or integrated with the first display 200, as shown in FIG. 3B) sends eye or head tracking data (e.g., gaze target data) to the one or more controllers 116. The one or more controllers 116 commands the remote object sensor 112 to steer transmission beams 1180 to the gaze target 176, and the resulting reflection is received by the one or more controllers 116. The one or more controllers 116 then generate object position data, which is then transmitted to the first display 200 as an image of the object that corresponds to both the gaze target of the operator and the position of the actual object as detected by the remote object sensor 112.

As shown in FIG. 3B, the first display 200 may be integrated with the gaze sensor 108. For example, the operator may be wearing a HWD or viewing a HUD that incorporates the gaze sensor 108 (e.g., head/eye tracking technology). HWDs and HUDs incorporating head/eye technology are well known to the skilled artisan. In some embodiments, the first display 200 (e.g., HWDs and HUDs) is configured so that the first operator 164, looking through a portion of the HWD or HUD, will see an image generated by the system 100 fed into the same portion of the HWD or HUD (e.g., the system 100 is synchronized so that the controller 116 will feed an enhanced image of the gaze target 176 that overlays the viewed gaze target 176). In other words, a gaze path of the first operator 164 as it passes through the HWD/HUD (e.g., or projects upon, in the case of a head down display or virtual reality display) may pass through a portion of the first display 200 that is a same portion of the first display 200 that the image of the object is displayed upon. This feedback (e.g., feeding and overlaying enhanced images) allows the first operator to view enhanced imagery on the first display generated by the system that sits within their field of view (possibly at all times).

Figure 4:
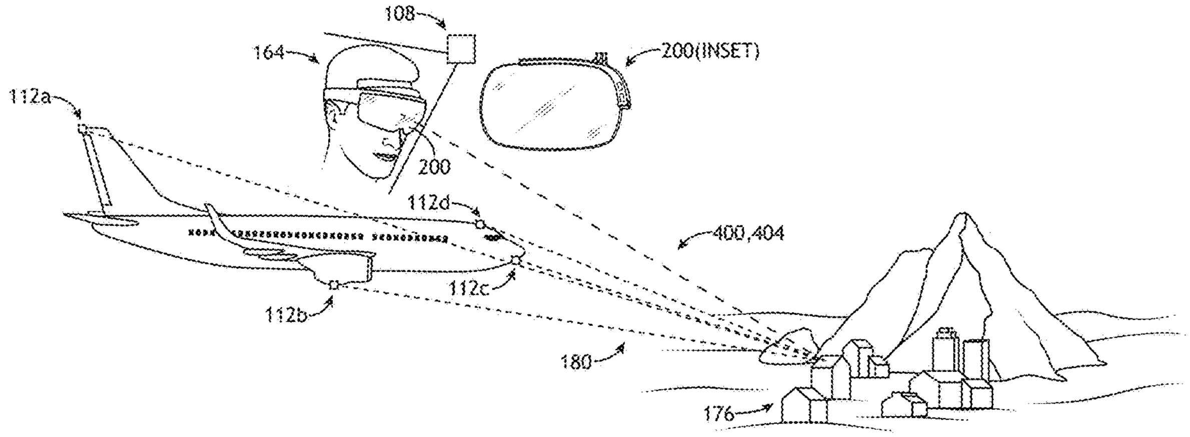
FIG. 4 illustrates synchronizing the transmission beams of an aircraft with a gaze target of an operator, in accordance with one or more embodiments of the disclosure.

Referring now to FIG. 4, a first operator 164 is shown focusing on a gaze target 176 through the first display 200 (e.g., an HWD). A gaze sensor 108 determines the relative position of the first operator's head or eyes, and the system 100 generates a gaze vector 400 (e.g., similar to the first operator's gaze path 404) that is based on the gaze target data generated from the gaze sensor 108. The remote object sensors 112 are synchronized with the gaze sensor 108 so that the transmission beams 180 are also focused on the gaze target 176. Images received via the remote object sensors 112 can then be transmitted to the first display 200, giving the first operator an enhanced view of the gaze target 176.

Figure 5:
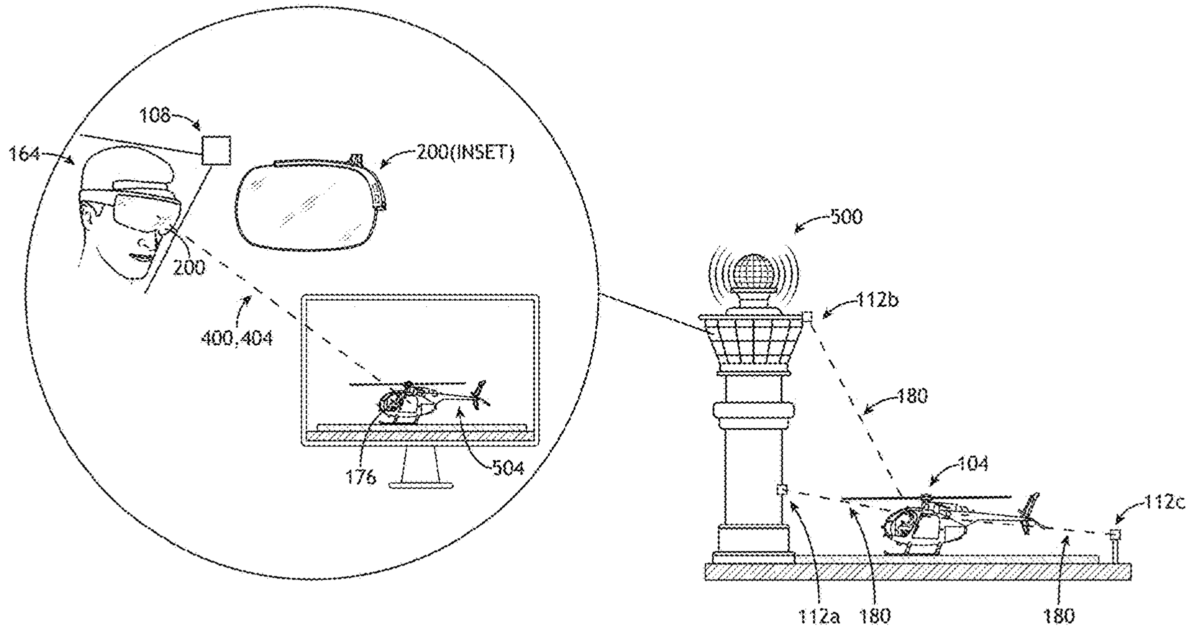
FIG. 5 illustrates synchronizing the transmission beams of an aircraft with a displayed gaze target of an operator, in accordance with one or more embodiments of the disclosure.

As discussed herein, the system 100 can be implemented in a real-world environment (e.g., the first operator looking directly at the gaze target 176), a synthetic environment, or a virtual environment. Referring to FIG. 5, the system 100 is implemented in an aircraft control tower 500 (e.g., an immobile structure). Here, the first operator 164 is an aircraft controller within the air control tower, and is viewing a gaze target 176 (e.g., an aircraft 104) that is imaged as a synthetic target (e.g., upon a second display 504, such as a head down display). The second display 504 is synchronized with the system 100 (e.g., the gaze sensor) so that the position of the first operators head or eyes relative to the second display can be calculated and that the gaze target 176 (e.g., the aircraft 102 on the second display 504) as viewed on the second display 504 can be correlated to a real-world gaze target (e.g., the aircraft 102 adjacent to the aircraft control tower 500). Remote object sensors 112 coupled to immobile structures (e.g., the aircraft control tower 500 or the ground) that are communicatively coupled to the gaze sensor 108 are then directed via the controller 116 to direct transmission beams 180 toward the aircraft 104. The system 100 then generates an image of the aircraft that can be transmitted to the first display 200, the second display 504, or both. In some embodiments, the image may also be sent to other displays (e.g., third displays), such as HUDs for operators (e.g., second operators of other aircraft 104. In some embodiments, the first operator is able to look directly toward the real-world object (e.g., the aircraft 104), and the resultant coordination between the gaze sensor 108 and the remote object sensors 112, results in the image of the gaze target 176 being sent to the first display 200 (e.g., without the need for a second display 504). In some embodiments, a second display 504 displays a virtual gaze target 176 that corresponds to the "real-world" gaze target 176, and the gaze path 404 from the first operator 164 either passes through or projects upon a portion of the second display 504 where the virtual gaze target is displayed, and the image of the object generated by the system 100 is displayed either on the first display 200, the second display 504, or a third display (e.g., a display viewable by a second operator, such as a second operator viewing the third display in a different vehicle or building than the first operator 164.)

The system 100 may be used in many different scenarios. For example, a first operator (e.g., air traffic controller) may receive a call from an aircraft 104 entering the aircraft control tower's airspace, stating the aircraft's approximate position. The first operator looks out the window toward the approximate position and the remote object sensors 112 affixed to the aircraft control tower 500, ground, or other fixed position (e.g., immobile structures) steer the transmission beams 180 to help pinpoint target, which is then shown on a head-down display, or a HUD/HWD worn by the air traffic controller.

In another scenario, the first operator 164 (e.g., air traffic controller receives a clearance request for takeoff on a foggy day, such that the runway/aircraft 104 cannot be seen by the tower. The first operator looks at a map of the airport shown on one of his second displays 504 (e.g., a head down display). The gaze sensor 108 determines where he is looking at the second display 504 and the remote object sensors 112 correspondingly steer the transmission beams 180 (e.g., mechanically, and/or electronically) towards the real-world location where the aircraft 104 is waiting to depart. The first operator 164 can now look outside and see the image of the waiting aircraft through his first display (HWD/HUD).

In some embodiments, the system 100 can be used for identifying/detecting aircraft in traffic situations. For example, the first operator 164 may be a first pilot in a first aircraft that receives a call from a second pilot in a second aircraft that cannot be seen by the first pilot. The first pilot may look in the general direction of the second aircraft, and through the coordinated effort of the gaze sensor 108 and remote object sensors 112 affixed to the aircraft 104 the first pilot receives enhanced imagery of the second aircraft, with images, enhanced images, annotations, or indications of the second aircraft appearing on this HUD/HWD.

In embodiments, the displays 200, 504 (e.g., first, second, third, or more displays) may receive enhanced imagery, annotated imagery (e.g., descriptive text added to images), representative imagery, or other imagery besides traditional or "camera like imagery". For example, for objects far away, the system 100 may display the object as a simple dot or other symbol on one or more of the displays 200, 504. The dot may become larger or change in shape, or size as the object comes closer. In another example, an object may be represented by an icon on one or more of the displays. For instance, an aircraft may be represented by a simple aircraft icon on one or more of the displays. In another example, remote object sensors 112 may provide enhanced imagery to one or more displays. For instance, data from the one or more remote object sensors 112 may provide enhanced imagery, such as by producing an actual image with specific targets being more pronounced or apparent, or by annotating existing images or scenes that highlight the gaze targets 176.

In embodiments, the system 100 may be implemented in a virtual environment. For example, the system 100 may be operated in an environment created by a set of cameras on a remotely operated/unpiloted aircraft that the pilot looks around in using a virtual reality (VR) headset (e.g., a first display 200). Through the head/eye position sensors 120 the gaze sensor 108 can determine a virtual gaze target 176 that can be correlated to a real-world gaze target 176. The remote object sensors 112, synchronized with the gaze sensor 108 can steer transmission beams 180 based towards the real-world gaze target 176, and the resulting imagery is then displayed upon the VR headset.

In another scenario, a remote or unmanned platform (e.g., vehicle or structure) is affixed with several imaging sensors that can be combined to produce a virtual image (e.g., acting as a second display 504). For example, the platform may have several cameras that combine to create a 360-degree live-feed view of the surroundings of the platform. A first operator 164 wearing a VR headset (e.g., the first display 200), could look around this 360-degree image. The gaze sensor 108 would determine the target of the operator's gaze within this virtual image and subsequently the system 100 would operate instruct the remote object sensors 112 on the platform to steer the transmission beams 180 to the real world/geographical location of the gaze.

In another scenario, a first operator 164, a rotary wing pilot, may be using a hook/winch system hanging below the aircraft 104. A remote object sensor 112 is installed to monitor the position of the hook, which may be obscured by other objects from the pilot's point of view. The pilot can direct his gaze towards the hook so that the remote object sensor 112 will steer transmission beams 180 towards the hook and provide maximally accurate information about the hook. Alternatively, the pilot can look at the environment surrounding the hook, which may also be obscured by objects/low visibility conditions, and the system 100 will scan the environment and display the information to the pilot.

As described, the system 100 increased the time of the transmission beam 180 (e.g., radar or lidar) on target by steering the transmission beams towards regions that a first operator 164 is interested in. This minimizes energy transmission regions that are not important to the first operator, and performance of the remote object sensor 112 is increased without fundamental changes to the remote object sensor 112 itself.

The system 100 provides increase imaging resolution wherever the first operator 164 is looking. The system 100 can be used in degraded or low visibility environments where a first operator 164 cannot easily see a target of interest, such as a landing zone or associated obstacles, but must focus on a specific region for safe operation. The system 100 when coupled with HWD or HUD technology, can improve speed at which nearby traffic and/or obstacles are identified. For example, when a first operator 164 (e.g., a pilot) is given a general direction to search, the system 100 immediately steers the remote object sensors 112 to pinpoint the target. The system 100 further provides an improvement in situational awareness under many conditions without consuming unnecessary power. The system 100 may be used in many different and varied environments (e.g., transportation, manufacturing, agriculture) and does not need to be limited to aerospace or vehicular environments.

In some embodiments, the controller 116 includes at least one processor 152, memory 156, and a communication interface 160. The at least one processor 152 may be implemented as any suitable processor(s), such as at least one general purpose processor, at least one central processing unit (CPU), at least one image processor, at least one graphics processing unit (GPU), at least one field-programmable gate array (FPGA), and/or at least one special purpose processor configured to execute instructions for performing (e.g., collectively performing if more than one processor) any or all of the operations disclosed throughout.

The communication interface 160 can be operatively configured to communicate with components of the system 100. For example, the communication interface 160 can be configured to retrieve data from the controller 116 or other devices, transmit data for storage in the memory 156, retrieve data from storage in the memory 156, and so forth. The communication interface 160 can also be communicatively coupled with the controller 116 to facilitate data transfer between components of the system 100 and the components outside of the system 100 (e.g., the non-system components of an aircraft 104). It should be noted that while the communication interface 160 is described as a component of the system 100, one or more components of the communication interface 160 can be implemented as external components communicatively coupled to the system 100 via a wired and/or wireless connection. The communication interface 160 can also include and/or connect to one or more input/output (I/O) devices. In embodiments, the communication interface 160 includes or is coupled to a transmitter, receiver, transceiver, physical connection interface, or any combination thereof.

The gaze sensor 108 may be configured to determine and track a position and/or an orientation of a user's head relative to an environment (e.g., a real-world environment such as an aircraft 104 or the earth, a synthetic environment, or a virtual environment). The gaze sensor 108 may be configured for performing fully automatic head and/or eye tracking operations in real time. The processor 124 of the gaze sensor 108 may be configured to process data received from the at least one head/eye position sensor 120 (e.g., an eye position sensor and/or a head position sensor) and output processed image data (e.g., head and/or eye tracking data) to one of the computing devices of the system and/or the processor 124, 140, 152 for use in generating images aligned with the user's field of view, such as augmented reality or virtual reality images aligned with the user's field of view to be displayed by the first display 200. For example, the processor 124, 152 may be configured to: receive the image sensor image data; based at least on the image sensor image data, determine a position and/or orientation of the gaze sensor 108 and/or eye/head position sensor 120; and/or determine and track a position and/or orientation of a user's head relative to an environment (e.g., a real-world environment such as an aircraft 104 or the earth, a synthetic environment, or a virtual environment). Additionally, for example, the processor 124, 140, 152 may be configured to: generate position and orientation data associated with such determined information and output the generated position and orientation data. The processor 126, 140, 152 may be configured to run various software applications or computer code stored in a non-transitory computer-readable medium (e.g., memory 128, 144, 156 and/or storage device) and configured to execute various instructions or operations. In some embodiments, the at least one processor 124, 140, 152 may be implemented as a special purpose processor configured to execute instructions for performing (e.g., collectively performing if more than one processor) any or all of the operations disclosed throughout. For example, one or processors 124, 140, 152 may be implemented to receive reflection data from the receiver 136, generate object position data based on the reflection data, and transmit the reflection data as image data to the first display 200.

The at least one processor 124, 140, 152 may be implemented as any suitable processor(s), such as at least one general purpose processor, at least one central processing unit (CPU), at least one image processor, at least one graphics processing unit (GPU), and/or at least one special purpose processor configured to execute instructions for performing (e.g., collectively performing if more than one processor) any or all of the operations disclosed throughout. In some embodiments, the processor 124, 140, 152 may be communicatively coupled to the first display 200. For example, the processor 124, 140, 152 may be configured to: receive gaze target data; receive image data (e.g., object position data) from the controller 116; generate and/or output image data to the first display 200, for example, based on the gaze sensor data and/or object position data; generate and/or output synthetic vision data, augmented reality and/or virtual reality image data to the first display 200, for example, based on the gaze sensor data and/or object position data; and/or generate and/or output other image data, which may include vehicle operation (e.g., aircraft 104) information, symbology, navigation information, tactical information, and/or sensor information to the first display, for example, based on the gaze target data or object position data.

The controller 116 may be implemented as any suitable computing device, such as an avionics computing device. In addition to providing processing functionality for one or more components of the system 100, the controller 116 may also be implemented to perform other functions including, but not limited to, receiving data from an internal measurement unit (IMU), receiving data from an enhanced flight vision system (EFVS), receiving data from an attitude heading reference system (AHRS), and/or receiving other sensor data. For example, based on the gaze target data and/or object position data, the controller 116 may generate and/or output other image data, which may include vehicle operation (e.g., aircraft) information, symbology, navigation information, tactical information, and/or sensor information to the first display 200.

In some embodiments, the gaze sensor 108 and/or head/eye sensor 120 may be used in conjunction with at least one Night Vision Imaging System (NVIS). The NVIS system may include at least one night-vision sensor 134. The NVIS may amplify and enhance images of an environment that has little visible light (e.g., a dark environment) by detecting and/or amplifying light (e.g., infrared light (e.g., near-infrared (NIR) light)) illuminating the environment. A range of light wavelengths that may be detected by the NVIS may be referred to as a NVIS-detectable range of wavelengths. For example, NVIS-detectable wavelengths may be and/or may include NIR wavelengths between 0.75-1 micrometers (μm) and visible light. Department of Defense Interface Standard, "Lighting, Aircraft, Night Vision Imaging System (NVIS) Compatible," MIL-STD-3009, issued Feb. 2, 2001, is incorporated by reference in its entirety. For example, according to MIL-STD-3009, NVIS sensors are typically much more sensitive in the red portion of the visible spectrum as well as part of the Near Infrared Region; typically, NVIS sensor sensitivity significantly starts to drop around 900 nm and is negligible above 1,000 nm. Further, for example, visible spectrum sensors are typically sensitive over approximately 400 to 900 nm. In some embodiments, wavelengths greater than 1,000 nm may not be detected by an NVIS, and emitters greater than 1,000 nm can be used to stimulate a conversion layer inside a sensor assembly.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system comprising:

at least one head tracker or eye tracker configured to sense at least one gaze target in an environment corresponding to a gaze of an eye or head of a first operator;

at least one remote object sensor configured to sense an object corresponding to the gaze target comprising:

at least one transmitter; and at least one receiver, wherein the remote object sensor is configured to transmit steered transmission beams;

at least one controller in communication with the head tracker or the eye tracker and the remote object sensor, the controller configured to:

receive gaze target data from the head tracker or the eye tracker;

transmit commands to the remote object sensor to steer transmission beams toward the object based on the gaze target data, wherein a reflection of the steered transmission beams from the object is received by the receiver;

receive reflection data from the receiver;

generate object position data based on the reflection data; and transmit the object position data;

a first display, wherein the first display is configured to receive image data based on the object position data and display an enhanced image of the object based on the image data, and a second display, wherein the second display displays a virtual gaze target corresponding to a real-world object, wherein a gaze path passes through or projects upon a portion of the second display, wherein the virtual gaze target is correlated with a real-world object, wherein commands are transmitted to the remote object sensor to steer transmission beams towards the real-world object, wherein an enhanced image of the real-world object is displayed upon the first display and/or the second display.

2. The system of claim 1, wherein a gaze path passes through or projects upon a portion of the first display, wherein the image of the object is displayed upon a same portion of the first display.

3. The system of claim 1, wherein the image of the object is displayed on a third display viewable by a second operator.

4. The system of claim 1, wherein the first display comprises a head up display (HUD), a helmet mounted display (HMD), or a head-wearable device (HWD).

5. The system of claim 1, wherein the environment comprises a real-world environment.

6. The system of claim 1, wherein the environment comprises a synthetic environment, wherein the at least one gaze target is positioned on a display viewed by the operator.

7. The system of claim 1, wherein the environment comprises a virtual environment.

8. The system of claim 1, wherein the at least one remote object sensor is coupled to an immobile structure.

9. The system of claim 1, wherein the at least one remote object sensor is coupled to a vehicle.

10. The system of claim 1, wherein the remote object sensor comprises a radar sensor.

11. The system of claim 1, wherein the remote object sensor comprises a lidar sensor.

12. A method for determining a position of an object comprising:

receiving gaze target data from a head tracker or an eye tracker;

transmitting commands to a remote object sensor to transmit steered transmission beams toward the object based on the gaze target data, wherein a reflection of the steered transmission beams is received by a receiver;

receiving reflection data from the receiver;

generating object position data based on the reflection of the steered transmission beams;

transmitting the object position data;

receiving, on a first display, image data based on the object position data;

displaying, on the first display, an image of the object based on the image data;

receiving gaze target data of a virtual gaze target on a second display;

correlating the virtual gaze target with a real-world object;

steer transmission beams toward the real-world object; and displaying an enhanced image of the real-world object on at least one of the first display and/or second display based on the transmission beams steered toward the real-world object.

* * * * *